United States Patent [19]

Esskuchen et al.

[11] Patent Number: 4,993,039
[45] Date of Patent: Feb. 12, 1991

[54] RING LASER GYRO

[75] Inventors: Uwe Esskuchen, Hanau; Werner Hansli, Alsbach, both of Fed. Rep. of Germany

[73] Assignee: Honeywell Regelsysteme GmbH, Fed. Rep. of Germany

[21] Appl. No.: 529,243

[22] Filed: May 25, 1990

[30] Foreign Application Priority Data

Jun. 2, 1989 [DE] Fed. Rep. of Germany ....... 3918050

[51] Int. Cl.⁵ .............................................. H01S 3/083
[52] U.S. Cl. ...................................... 372/94; 372/87; 356/350
[58] Field of Search ...................... 372/94, 87; 356/350

[56] References Cited

U.S. PATENT DOCUMENTS

| 4,481,635 | 11/1984 | Broberg et al. | 372/94 |
| 4,667,162 | 5/1987 | Broberg et al. | |
| 4,848,909 | 7/1989 | Cole | 372/94 |
| 4,926,437 | 5/1990 | Ford | 372/94 |

FOREIGN PATENT DOCUMENTS 1536081 10/1977 United Kingdom .

Primary Examiner—Leon Scott, Jr.
Attorney, Agent, or Firm—Haugen and Nikolai

[57] ABSTRACT

A ring laser gyro including two partial gas discharge paths in which by an electrode arrangement an opposite gas discharge is ignited. Outside of the discharge path between the electrodes (24,26) connected to the ignition voltage ion traps (40,42) are provided in order to prevent a gas discharge between those electrodes (FIG. 1).

9 Claims, 1 Drawing Sheet

RING LASER GYRO

BACKGROUND OF THE INVENTION

The present invention relates generally to ring laser gyros and, more particularly to a ring laser gyro including at least one ion trap outside of the gas discharge path.

It is known, for example, from German Patent No. DE-OS 28 39 066 with respect to a triangular-shaped laser block to arrange, symmetrically to the center line of the triangular block, at each side leg an anode and at the base leg of the triangular block a cathode. By applying an ignition voltage between the anodes and the cathode ionization of the gas is achieved and a gas discharge is ignited so that two counter-propagating laser beams are generated within the triangular-shaped resonator path. The ignition voltage of the gas discharge depends on the shape and the length of the discharge path and also on the gas pressure and the gas composition. When the gas discharge has been started, then the inner resistance of the discharge path is decreased and the voltage between the anode and the cathode is reduced to the burning voltage. In gas discharges having two partial discharge paths as, for example, in a ring laser gyro, both paths do not ignite at the same time. In such cases a situation arises wherein one electrode is still on the ignition voltage whereas between the two other electrodes only a potential difference exists according to the burning voltage. Since the ignition voltage is remarkably higher than the burning voltage the possibility arises that the discharge is ignited in the resonating bore which does not belong to the amplifying bore. This situation must be prevented and, therefore, measures have already been taken within the ignition electronics by which the discharge is switched-off in the event where the voltage values at the electrodes after the ignition ar not symmetrical. Afterwards an ignition operation is again started. This measure does not solve the basic problem since the discharge in both paths basically cannot be started at the same time.

SUMMARY OF THE INVENTION

It is therefore a primary object of the present invention to provide measures by which the gas discharge in a ring laser is limited to the inherent amplifying bore even in the event where the partial discharge paths are not ignited at the same time.

According to the present invention a ring laser includes an ion trap provided behind the electrodes connected to the ignition voltage and in the vicinity of the resonating bore in which no discharge shall be occur. The ion trap may consist of an electrical or magnetic field respectively.

Other objects, features and advantages of the invention will become apparent to those skilled in the art through the description of the preferred embodiment, claims and drawings herein.

BRIEF DESCRIPTION OF THE DRAWINGS

The invention shall be further described with respect to the figures.

DESCRIPTION OF THE PREFERRED EMBODIMENT

Figure 1:
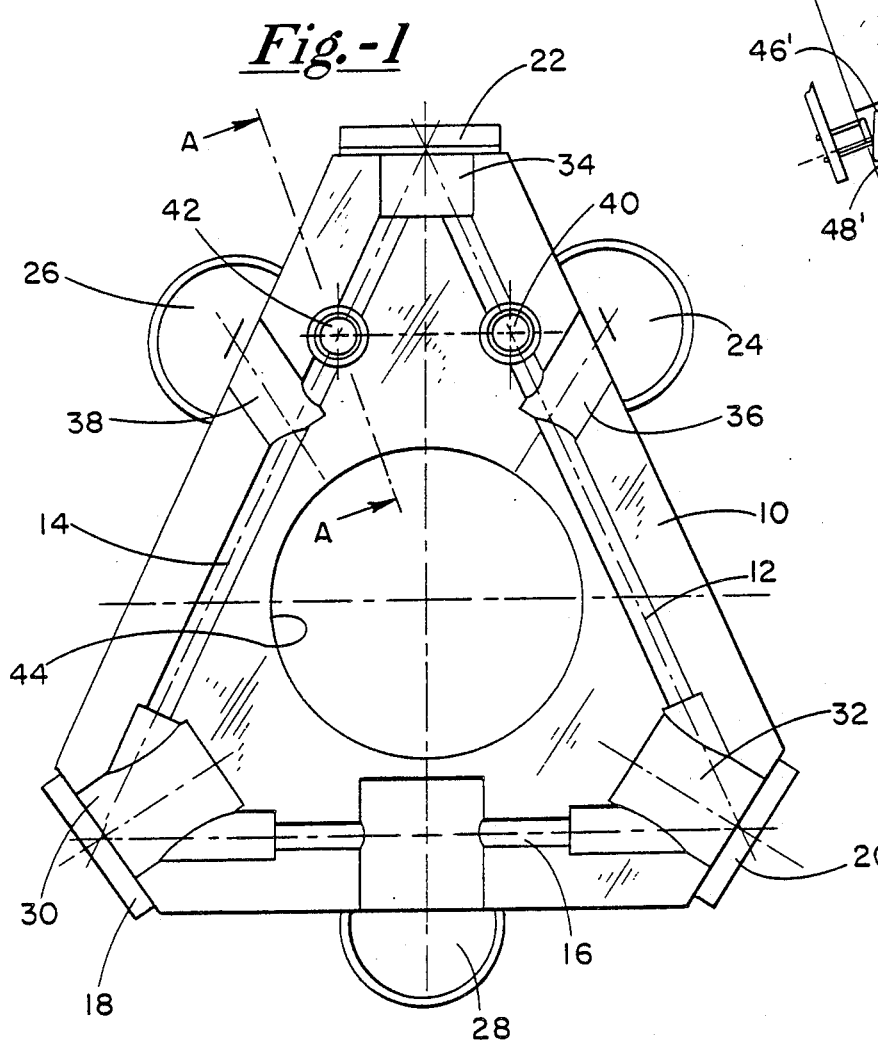
FIG. 1 shows a sectional plan view onto a ring laser gyro.

According to FIG. 1 an equal-sided laser block 10 comprises bores 12, 14 and 16 extending parallel to its side walls which are closed in the corner points by mirrors 18, 20 and 22 in order to form a cavity resonator. In order to start a gas discharge and to produce two counter-propagating laser beams two cathodes 24 and 26 are arranged on both side legs of the block 10 symmetrical to the center line of the equal-sided triangular and one anode 28 is provided on the base leg of the block 10.

At the corner points of the laser block 10 the bores 12, 14 and 16 open into gas reaming bores 30, 32 and 34 by which the contained gas volume is enlarged.

The inherent amplifying bore is formed by the bores 12 and 14 in the range between the cathodes 24 and 26 and the corner mirrors 18 and 20. In order to limit the ignition of the partial discharge path to this range of the bores oblique bores 36 and 38 are provided which connect the cathodes 24 and 26 to the amplifying bores 12 and 14. The obliquity is selected in such a way that the bores 36 and 38 have a component in direction to the amplifying bores 12 and 14. This measure already renders it difficult to start an ignition in the wrong direction.

In the event where this design does not already achieve the desired effect ion traps 40 and 42 are provided between the cathodes 24 and 26 and the point of the triangular-shaped laser block. The ion traps shall be further described hereinbelow.

A circular-shaped central cut-out 44 is provided within the laser block 10 and serves to receive a vibration device well known in the art in order to impart to the ring laser gyro a back and forth oscillation.

Figure 1A:
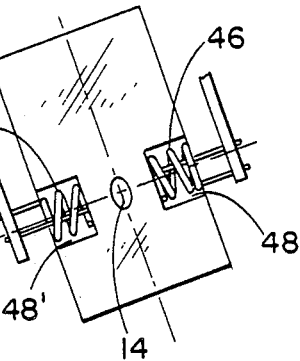
FIG. 1A shows a sectional view along line A—A in FIG. 1 according to a first embodiment of the invention.

According to FIG. 1A the ion traps 40 and 42 comprise two coils 46 and 46' which are arranged within blind holes 48 and 48'. The blind holes 48 and 48' are provided within the cover side and the bottom side of the laser block 10. The bottom of the blind holes are a distance from the bores 12 and 14. The bore extends symmetrically between the coil arrangement so that when a current is flowing through the coils a magnetic field is produced which, in the event where this portion of the bore is passed by charged particles of the plasma, those particles are deflected so that they cannot reach the other cathode. The generation of the magnetic field for the ion deflection requires high currents since the coils are not allowed to contain soft iron cores for the field concentration because at the operation of the ring laser gyro the remaining remanents would be negatively influence the quality of the ring laser gyro.

Figure 1B:
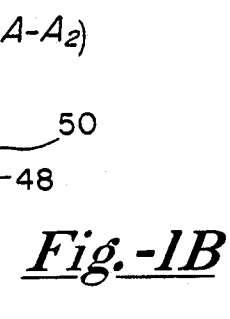
FIG. 1B shows a sectional view along line A—A in FIG. 1 according to a second embodiment of the invention.

An alternate embodiment of the invention provides a better solution which does not adversely influence the quality of the ring laser gyro. This is given by the device according to FIG. 1b at which, on the bottom of the blind holes 48 and 48', two condenser plates 50 and 50' are provided. The condenser plates form a plate condenser which has the bore 14 in between. During the ignition operation a high voltage is applied to the condenser plates. A high voltage is required for producing the electrical field. The applied voltage should be galvanically separated from the ignition voltage and should be applied to the condenser plates before the ignition voltage is applied. After the ignition has been started the applied control voltage is switched-off and the condenser plates are short circuited in order to remove the electrical field. In this way the quality of the ring laser gyro is not adversely influenced.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

We claim:

1. A ring laser gyro including a laser block comprising a symmetrical electrode arrangement for producing a gas discharge in two partial gas discharge paths so as to produce two counter-propagating laser beams in a cavity resonator formed by bores in the laser block, and further comprising at least one ion trap formed in the laser block outside of the gas discharge path.

2. The ring laser gyro of claim 1 wherein at least one ion trap comprises two symmetrically arranged ion traps.

3. The ring laser gyro of claim 2 wherein the ion traps include an arrangement of condenser plates normal to the bore and connected to a voltage.

4. The ring laser gyro of claim 3 wherein the condenser plates are arranged in blind holes within the block, wherein the blind holes are provided in the cover and the bottom surface of the block and the bottom of the blind hole comprises a predetermined distance from the resonator bore.

5. The ring laser gyro of claim 2 wherein the ion traps include an arrangement of current-carrying coils normal to the bore.

6. The ring/laser gyro of claim 5 wherein the coils are arranged in blind holes within the block, wherein the blind holes are provided in the cover and the bottom surface of the block and the bottom of the blind hole comprises a predetermined distance from the resonator bore.

7. The ring laser gyro of claim 2 comprising a triangular-shaped block into which the bores forming the resonator are machined wherein two electrodes connected to the ignition voltage are arranged on the side legs of the triangular-shaped block and one electrode connected to the reference voltage is arranged on the base leg of the triangular-shaped block, and wherein the ion traps are arranged between the triangular point of the triangular-shaped block and the electrodes connected to the ignition voltage.

8. The ring laser gyro of claim 7 wherein the electrodes on the side legs of the triangular-shaped block are formed by cathodes and the electrode on the base leg of the triangular-shaped block is formed by an anode.

9. The ring laser gyro of claim 1 wherein the two electrodes cooperating with the third electrode are connected to each of the resonator bores via oblique bores.

* * * * *